United States Patent
Hoffman et al.

(10) Patent No.: US 10,762,135 B2
(45) Date of Patent: Sep. 1, 2020

(54) RECOMMENDING SOFTWARE ACTIONS TO CREATE AN IMAGE AND RECOMMENDING IMAGES TO DEMONSTRATE THE EFFECTS OF SOFTWARE ACTIONS

(71) Applicant: Adobe Inc., San Jose, CA (US)

(72) Inventors: Matthew Douglas Hoffman, San Francisco, CA (US); Longqi Yang, Jersey City, NJ (US); Hailin Jin, San Jose, CA (US); Chen Fang, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 477 days.

(21) Appl. No.: 15/357,864

(22) Filed: Nov. 21, 2016

(65) Prior Publication Data

US 2018/0143988 A1    May 24, 2018

(51) Int. Cl.
  *G06F 16/9032* (2019.01)
  *G06F 16/2457* (2019.01)
  *G06F 40/166* (2020.01)

(52) U.S. Cl.
  CPC .. *G06F 16/90324* (2019.01); *G06F 16/24578* (2019.01); *G06F 40/166* (2020.01)

(58) Field of Classification Search
  CPC ............... G06F 17/30011; G06F 15/18; G06F 17/3053; G06F 16/583; G06F 16/2457; G06F 16/9032; G06F 16/90324; G06N 3/04; G06N 5/04; G06T 9/002; H04N 17/00; H04N 19/51

USPC .......................................................... 707/723
See application file for complete search history.

(56) References Cited

U.S. PATENT DOCUMENTS

| | | | | |
|---|---|---|---|---|
| 7,493,294 | B2 * | 2/2009 | Flinn ....................... | G06F 15/18 |
| 8,909,596 | B1 * | 12/2014 | Zhang ................ | G06F 17/30011 |
| 2009/0115851 | A1 * | 5/2009 | Rieder .................... | H04N 17/00 |
| 2015/0363688 | A1 * | 12/2015 | Gao .......................... | G06N 3/04 |
| 2016/0098844 | A1 * | 4/2016 | Shaji ....................... | G06F 17/30 |
| 2016/0224803 | A1 * | 8/2016 | Frank ................. | G06F 21/6245 |

OTHER PUBLICATIONS

"Combined Search and Examination Report", GB Application No. 1716526.7, dated Mar. 12, 2018, 7 pages.
He,"VBPR: Visual Bayesian Personalized Ranking from Implicit Feedback", Oct. 2015, 7 pages.
Khan,"Exploring Personalized Command Recommendations based on Information Found in Web Documentation", IUI 2015 • Recommenders / Web, Mar. 2015, pp. 225-235.

(Continued)

*Primary Examiner* — Shahid A Alam
(74) *Attorney, Agent, or Firm* — SBMC

(57) ABSTRACT

A digital medium environment includes an asset processing application that performs editing of assets. A projection function is trained using pairs of actions pertaining to software edits, and assets resulting from the actions to learn a joint embedding between the actions and the assets. The projection function is used in the asset processing application to recommend software actions to create an asset, and also to recommend assets to demonstrate the effects of software actions. Recommendations are based on ranking distance measures that measure distances between actions representations and asset representations in a vector space.

20 Claims, 6 Drawing Sheets

(56) References Cited

OTHER PUBLICATIONS

Li,"Design and Evaluation of a Command Recommendation System for Software Applications", ACM Transactions on Computer-Human Interaction, vol. 18, No. 2, Article 6, Jun. 2011, 35 pages.
Matejka,"CommunityCommands: Command Recommendations for Software Applications", In Proceedings of the 22nd annual ACM symposium on User interface software and technology, Oct. 2009, pp. 193-202.
"Foreign Office Action", GB Application No. 1716526.7, dated Mar. 6, 2019, 3 pages.
"Foreign Office Action", GB Application No. 1716526.7, dated Jan. 2, 2019, 4 pages.

\* cited by examiner

RECOMMENDING SOFTWARE ACTIONS TO CREATE AN IMAGE AND RECOMMENDING IMAGES TO DEMONSTRATE THE EFFECTS OF SOFTWARE ACTIONS

BACKGROUND

Designers often edit assets, such as images, videos, audio files, documents, presentations, drawings, and the like, using asset processing applications. Asset processing applications may recommend actions to a designer who is editing a particular asset. For instance, a goal of recommending actions may be to show a designer new or unexplored features of the asset processing application. Recommended actions may include software edits to be made to the particular asset being edited. For instance, in the case where the designer is editing an image, an image editing application may recommend software edits including cropping and applying a particular filter to the image. Such recommended actions, however, are usually based on a history of edits applied by the designer, rather than the particular asset being edited by the designer.

Furthermore, asset processing applications may recommend assets to a designer. For instance, in the case where a designer is editing an image, an image editing application may recommend an image to the designer. Such recommended assets are usually based on designer preferences, and the goal of recommending the assets may be to increase the chance the designer will use (e.g., license, buy, download, or view) the recommended assets. For example, if a designer often edits images of automobiles, or "likes" images of automobiles (e.g., includes images of automobiles in a favorites list), an image editing application may recommend images of automobiles for use by the designer. Such recommended assets are based on the designer's preferences toward images of automobiles, rather than based on actions, such as software edits, that the designer is going to perform, or is considering performing.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In one or more implementations, in a digital medium environment including an asset processing application that performs editing of assets, an improved editing method implemented by the asset processing application, the method comprising: determining, by the at least one computing device, whether an input representation is an actions representation or an asset representation; responsive to determining the input representation is an actions representation: ranking, by the at least one computing device, a plurality of asset representations according to a distance measure that measures distances between the actions representation and the asset representations in a vector space; and recommending, by the at least one computing device, at least one of the plurality of asset representations based on the ranking of the plurality of asset representations; and responsive to determining the input representation is an asset representation: processing, by the at least one computing device, the asset representation with a projection function that projects the asset representation to the vector space; ranking, by the at least one computing device, a plurality of actions representations according to a distance measure that measures distances between the processed asset representation and the plurality of actions representations in the vector space; and recommending, by the at least one computing device, a set of actions based on the ranking of the plurality of actions representations.

In one or more implementations, a system implemented in a digital medium environment including a computing device having an asset processing application to perform editing of assets, the system comprising: a processing system; and at least one computer readable medium storing instructions executable via the processing system to implement a media processing application configured to perform operations comprising: obtaining an asset representation comprising a vector derived from content comprising an asset; accessing a plurality of actions representations each comprising a vector derived from a respective list of software actions; processing the asset representation with a projection function by setting a length of the vector comprising the asset representation equal to the length of the vectors comprising the actions representations; ranking the accessed actions representations according to a distance measure that measures distances between the vector comprising the processed asset representation and the vectors comprising the accessed actions representations; and recommending a set of actions based on the ranking of the accessed actions representations.

In one or more implementations, in a digital medium environment including an asset processing application that performs editing of assets, an improved editing method implemented by the asset processing application, the method comprising: a step for receiving, by the at least one computing device, a list of actions pertaining to software edits of assets; a step for determining, by the at least one computing device, an actions representation by forming a vector based on the list of actions, the vector representing the software edits; a step for ranking, by the at least one computing device, a plurality of asset representations according to a distance measure that measures distances between the actions representation and the plurality of asset representations, each of the plurality of asset representations having a dimensionality equal to a dimensionality of the actions representation determined by the length of the vector; and a step for recommending, by the at least one computing device, at least one of the asset representations based on the ranking of the plurality of asset representations.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
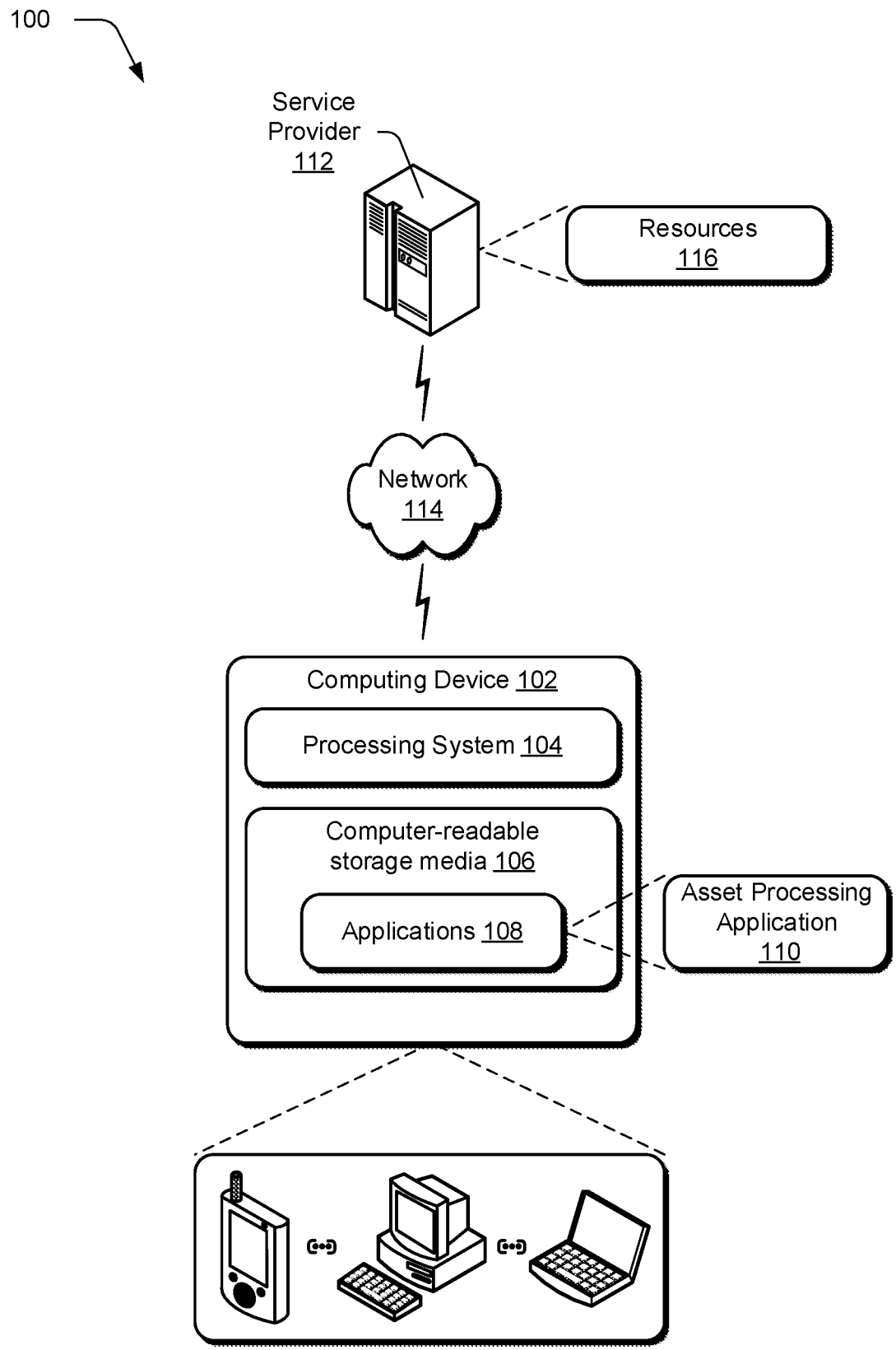
FIG. 1 is an illustration of a digital medium environment in an example implementation that is operable to employ techniques described herein.

In the description below, techniques for recommending assets and actions are described in the context of editing an asset, such as an image. It is to be appreciated and understood, however, that the techniques can be utilized with various assets other than images, such as video content, documents (e.g., text, maps, manuals, etc.) presentations, drawings, editable web pages, audio files, and the like without departing from the spirit and scope of the claimed subject matter.

In contrast to systems that recommend actions (e.g., software edits) based on a history of edits applied by a designer to show the designer new or unexplored features of an asset processing application, this disclosure describes techniques for recommending actions for an asset provided by the designer (e.g., for an image being edited by the designer) selected according to a distance measure between the asset provided by the designer and a plurality of representations of actions. Moreover, in contrast to systems that recommend assets based on designer preferences to increase the chance the designer will use the recommended asset, this disclosure describes techniques for recommending assets for actions (e.g. software edits) the designer may perform selected according to a distance measure between representations of the actions the designer may perform and a plurality of representations of assets. A projection function is used to transform representations of assets to a same dimension as representations of actions, in order to enable calculation of the distance measure in a vector space.

By using a projection function that is trained on pairs of actions and assets resulting from those actions, relationships between actions and assets are learned by the projection function and can be used to make reliable recommendations. These learned relationships represent a joint embedding between actions and assets. By transforming representations of assets with such a trained projection function, similarities of actions and assets can be determined based on simple mathematical comparisons of representations of assets and representations of actions in a vector space, such as comparisons of mean-squared errors between two vectors. Based on comparisons in the vector space, recommendations of software actions and assets can be made that reflect a "closeness" in the vector space according to the joint embedding learned by the projection function. Therefore, software actions are reliably recommended that are well suited for a particular asset, and assets are reliably recommended that are well suited to demonstrate the effects of particular software actions.

The projection function can be any suitable function, such as a linear projection model or a neural network, and is trained using pairs of actions and assets resulting from those actions. For instance, actions can be obtained from logs of actions performed by a user and the assets resulting from the actions can be obtained from a project uploaded by the user on an online social platform (e.g., an uploaded image the user has edited).

The projection function, once trained, is used to enable calculation of the distance measure in a vector space when an asset or actions are input to the asset processing application. For instance, provided an asset, actions are recommended according to the distance measure, and provided actions, an asset or assets are recommended according to the distance measure. The recommended actions can be used to efficiently create an asset, such as an image, and the recommended asset can be used to demonstrate effects of actions, such as effects of software edits to an image.

This constitutes an improvement over current approaches which primarily recommend actions based on a user's software usage history, and primarily, if not exclusively, recommend assets based on a user's preferences. The nature of the described embodiments to learn a joint embedding between software actions and assets provides for useful recommendations of software actions and assets because the recommendations are based on comparisons of measures that indicate similarity according to the learned joint embedding, as discussed below in more detail.

In the following discussion, terms are first described that are used herein. An example digital medium environment is then described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Terms

In this section, terms used throughout the disclosure are described for convenience. Descriptions of these terms are by way of example, and not limitation.

Asset: A structure containing content that can be edited or consumed by a user. Examples of assets include images, videos, documents (e.g., text, maps, manuals, etc.,) presentations, drawings, editable web pages, audio files, and the like.

Asset Representation: The representation of content of an asset as a vector in a vector space.

Actions: A list of software actions, such as edits to be applied to an image.

Actions Representation: The representation of software actions as a vector in a vector space.

Digital Medium Environment: Various computing devices and resources that can be utilized to implement the techniques described herein.

Distance Measure: A measure that measures distance between two representations, such as an actions representation and an asset representation, in a vector space. The distance represents similarity in the vector space, and is measured by comparing the representations in the vector space.

Input Representation: A representation input to a system or procedure. An input representation can be an actions representation or an asset representation.

Projection Function: A function that projects an input in a vector space to a sub-space, such as a sub-space of the vector space. For instance, a projection function may process a representation by changing the length of the vector comprising the representation. Additionally, values of the representation can be changed by processing of the projection function. A projection function may also process an asset to produce an asset representation in a vector-space. Examples of projection functions include linear models and neural networks.

Vector Space: A linear space containing vectors which may be added together to form a vector in the vector space, and multiplied by a scalar to form a vector in the vector space.

Having considered example terms used herein, consider now a discussion of an example digital medium environment.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a computing device 102 including a processing system 104 that may include one or more processing devices, one or more computer-readable storage media 106, and various applications 108 embodied on the computer-readable storage media 106 and operable via the processing system 104 to implement corresponding functionality described herein. In at least some implementations, applications 108 includes an asset processing application 110. The asset processing application 110 is configured to recommend software actions to create an asset and recommend assets to demonstrate the effects of software actions, as described below in more detail.

Applications 108 may also include a web browser which is operable to access various kinds of web-based resources (e.g., assets, lists of actions, content, and services). The applications 108 may also represent a client-side component having integrated functionality operable to access web-based resources (e.g., a network-enabled application), browse the Internet, interact with online providers, and so forth. Applications 108 may also include an interface operable to access assets and the like from various resources, including asset stores. Applications 108 may further include an operating system for the computing device and other device applications.

The computing device 102 may be configured as any suitable type of computing device. For example, the computing device may be configured as a desktop computer, a laptop computer, a workstation (e.g., a non-linear editor or digital audio workstation), a mobile device (e.g., assuming a handheld configuration such as a tablet or mobile phone), a tablet, a camera, a gaming station, and so forth. Thus, the computing device 102 may range from full resource devices with substantial memory and processor resources (e.g., personal computers, game consoles) to a low-resource device with limited memory or processing resources (e.g., mobile devices). Additionally, although a single computing device 102 is shown, the computing device 102 may be representative of a plurality of different devices to perform operations "over the cloud" as further described in relation to FIG. 8.

The digital medium environment 100 further depicts one or more service providers 112, configured to communicate with computing device 102 over a network 114, such as the Internet, to provide a "cloud-based" computing environment. Network 114 may comprise a variety of networks, including the Internet, an intranet, local area network (LAN), wide area network (WAN), personal area network (PAN), body area network (BAN), cellular networks, terrestrial networks, satellite networks, combinations of networks, and the like, and as such may be wired, wireless, or a combination thereof.

Generally, a service provider 112 is configured to make various resources 116 available over the network 114 to clients. In some scenarios, users may sign up for accounts that are employed to access corresponding resources from a provider. The provider may authenticate credentials of a user (e.g., username and password) before granting access to an account and corresponding resources 116. Resources 116 may be licensed, purchased, or may be made freely available, (e.g., without authentication, license, or account-based access). The resources 116 can include any suitable combination of services and content made available over a network by one or more providers. Some examples of services include, but are not limited to, an asset processing service (such as one that employs an asset processing application such as asset processing application 110), an image editing service, a web development and management service, a collaboration service, a social networking service, a messaging service, an advertisement service, and so forth. Content may include various combinations of assets, including videos, ads, audio, multi-media streams, animations, images, web documents, web pages, applications, device applications, text documents, drawings, presentations, and the like.

Resources 116 may also include an asset store operable to provide assets and actions to asset processing application 110. Assets and actions can be provided to asset processing application 110 in any suitable form, such as vectorized asset representations and vectorized actions representations (discussed below), raw or original assets (e.g., viewable images stored in a format according to a published standard) and lists of actions (e.g., sequences of software actions), or combinations thereof. Asset processing applications may include asset editing capabilities, and therefore may comprise asset editing applications.

Various types of input devices and input instrumentalities can be used to provide input to computing device 102. For example, the computing device can recognize input as being a mouse input, stylus input, touch input, input provided through a natural user interface, and the like. Thus, the computing device can recognize multiple types of gestures including touch gestures and gestures provided through a natural user interface. Computing device 102 can also include a graphical user interface configured to display assets, asset representations, lists of actions, and actions representations.

Though illustrated in FIG. 1 separately from computing device 102, computing device 102 may comprise network 114 and service provider 112, so that in some implementations, the operations described herein can be performed on computing device 102. In other implementations, service provider 112 represents a third party to computing device 102 and performs at least some of the operations described herein.

Having considered an example digital medium environment, consider now a discussion of a digital medium environment including an example asset processing application comprising an actions representation component, an asset representation component, a database component, a projection function component, a distance measure component, and a recommendation component.

Example Asset Processing Application

Figure 2:
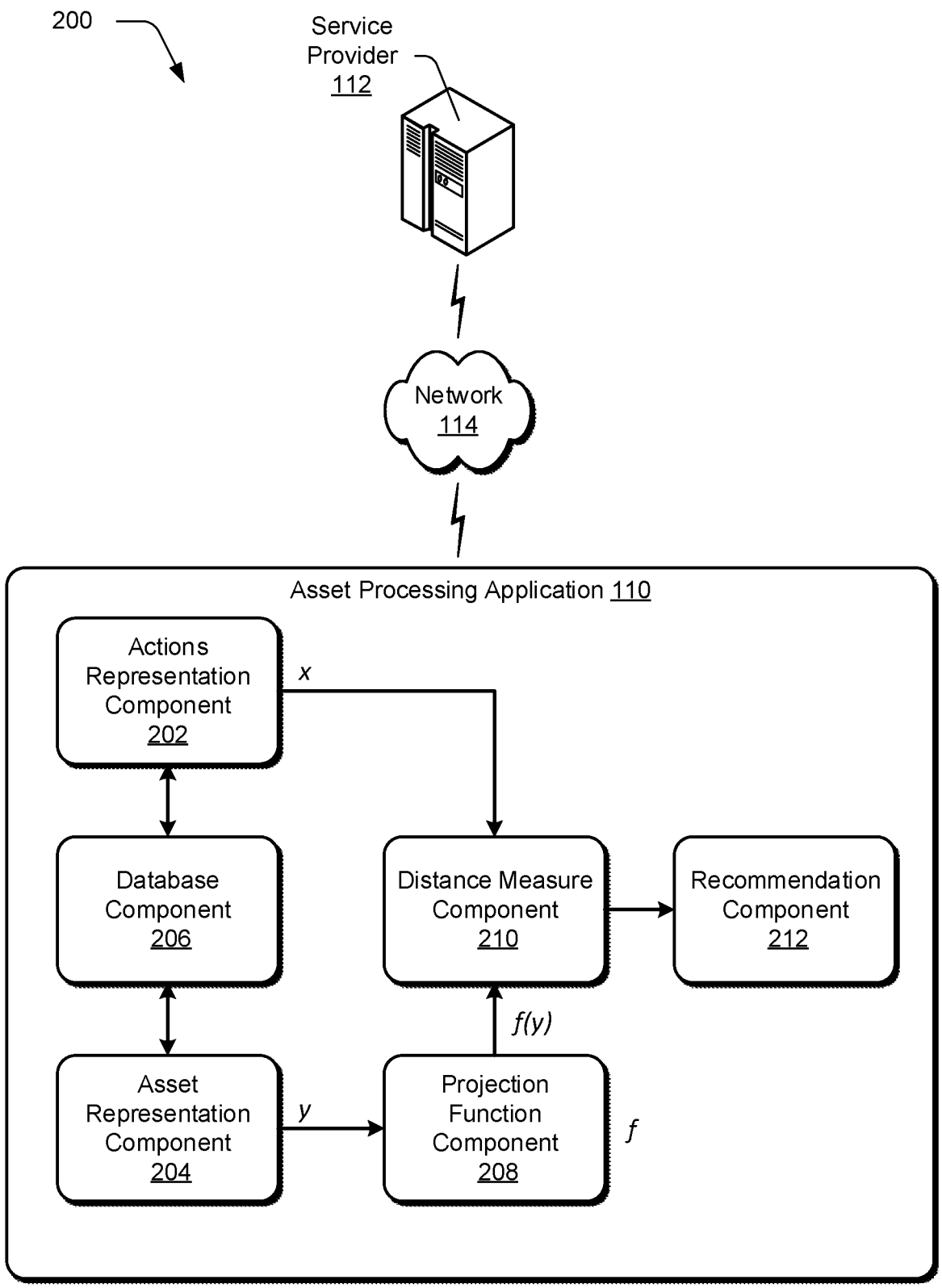
FIG. 2 illustrates a digital medium environment including an example asset processing application comprising an actions representation component, an asset representation component, a database component, a projection function component, a distance measure component, and a recommendation component in accordance with one or more aspects of the disclosure.

FIG. 2 illustrates a digital medium environment 200 that includes an example asset processing application 110. In this implementation, the asset processing application 110 includes actions representation component 202, asset representation component 204, database component 206, projection function component 208, distance measure component 210, and recommendation component 212.

This section is organized as follows: a discussion of the components of example asset processing application 110 is followed by a discussion of training a projection function, which is followed by a discussion of recommending software actions to create an asset, which is followed by a discussion of recommending assets to demonstrate the effects of software actions.

Components of Example Asset Processing Application

Actions representation component 202 is representative of functionality that implements processing of actions, such as software edits, to represent actions in a vector space. The representation of the actions in the vector space is referred to as an actions representation, and is indicated by the vector x output from actions representation component 202 in FIG. 2.

The actions representation can be formed in any suitable way, so long as the actions are represented by the actions representation in a vector space. Furthermore, the vector space can be defined in any suitable way. In one example, a vector space is defined based on a number of candidate actions that can be performed (e.g., a number of possible edits that can be made). For instance, suppose an image is to be edited and edits that can be applied to the image include, by way of example and not limitation, crop, blur, and sharpen. A vector space is defined from these candidate edits as $$V = \begin{bmatrix} crop \\ blur \\ sharpen \end{bmatrix}$$

An actions representation, x, in vector space, V, can be determined by counting the number of occurrences of each of the candidate edits in a list of actions provided to actions representation component 202. The elements of the actions representation, x, are set to the number of occurrences of the candidate edits in the list of actions. For example, if a list of actions comprises the sequence of four actions crop, blur, blur, and blur, actions representation, x, in vector space, V, is set to $$x = \begin{bmatrix} 1 \\ 3 \\ 0 \end{bmatrix}$$

since crop occurs once, blur occurs three times, and sharpen does not occur in the sequence of four actions.

In another example of a vector space, a vector space is defined by concatenating the vector space V described above with itself a number of times equal to the number of actions in the list or sequence of actions. For instance, for four actions in a sequence of actions, vector space Z is defined from V as $Z=[V^T \vdots V^T \vdots V^T \vdots V^T]^T$, where $[\bullet]^T$ denotes transpose. An actions representation, x, in vector space, Z, can be determined by setting a one to the edit performed at each step, and a zero otherwise at that step. Here, each step corresponds to a different subspace V in Z. Continuing the example sequence of four actions crop, blur, blur, and blur, actions representation, x, in vector space, Z, is set to $x=[[100][010][010][010]]^T$ (where redundant brackets are included for clarity). As defined, vector space Z preserves the order of the actions in the actions sequence, unlike vector space V above. In this example, the actions representation comprises a binary vector (e.g., with binary elements, "0" or "1"). In an implementation, a vector is compressed, such as using source compression techniques, to form the vector x comprising the actions representation in FIG. 2. For instance, the binary vector x described above can be compressed to form the actions representation using any suitable compression technique, including by way of example and not limitation, lossless compression, lossy compression, Lempel-Ziv compression, Huffman coding, run-length coding, combinations thereof, and the like.

Asset representation component 204 is representative of functionality that implements processing of assets, such as images, to represent content of the asset in a vector space. The representation of the asset in the vector space is referred to as an asset representation, and is indicated by the vectory output from asset representation component 204 in FIG. 2. In an implementation, the length of the vectory is not equal to the length of the vector x.

The asset representation can be formed in any suitable way, so long as the contents of the asset are represented by the asset representation in a vector space. Furthermore, the vector space can be defined in any suitable way. In one example, a vector space is defined according to the number of pixels in an image, and asset representation, y, is formed by concatenating each of the pixels together into a vector. In another example, a vector space is defined as a number of neurons comprising a neural network. An asset is processed by the neural network in asset representation component 204, and the asset representation in the vector space is determined from the activation values of the neurons comprising the neural network (e.g., each element of the vector space corresponds to a different neuron, and elements of the asset representation are set to activation values of the neurons).

Furthermore, the asset representation can be determined by processing an asset with a projection function configured to derive a vector from the asset. In an implementation, the asset representation is an image representation corresponding to an output of a projection function that processes an image and produces a vector derived from content of the image.

Database component 206 is representative of functionality that implements storage and retrieval of assets, actions, asset representations, and actions representations. Database component 206 is configured to access databases, such as databases of assets and databases of actions. Databases can comprise computing device 102. Databases can also comprise service provider 112, so that database component 206 is configured to access databases over network 114.

Databases accessed by database component 206 can be any suitable type of databases. For example, databases may include databases of assets (e.g., viewable images, videos, and the like), databases of asset representations (e.g., images that have been pre-processed by a neural network and stored as vectors), databases of actions (e.g., lists of candidate software edits), databases of actions representations (e.g., parameterizations of sequences of actions in a pre-determined vector space), and combinations thereof.

Database component 206 is configured to access databases and provide database contents to actions representation component 202 and asset representation component 204. Furthermore, database component 206 is configured to receive assets, actions, asset representations, and actions representations from a user, and provide the assets and asset representations to asset representation component 204, and the actions and actions representations to actions representation component 202. For example, a user may specify a set of actions the user is interested in applying to an asset, and database component 206 can provide the user-specified actions to actions representation component 202 to form an actions representation according to the user-specified actions.

Database component 206 is also configured to store actions representations provided from actions representation component 202, and asset representations provided from asset representation component 204. For example, database component 206 can store actions representations and asset representations in databases comprising computing device 102, databases comprising service provider 112, or combinations thereof.

Projection function component 208 is representative of functionality that processes asset representations from asset representation component 204 with a projection function that sets a dimensionality of the processed asset representation equal to a dimensionality of an actions representation provided from actions representation component 202. The projection function is indicated by the variable $f$ proximate projection function component 208 in FIG. 2. The output of the projection function is indicated by the vector $f(y)$. The dimensionality of a processed asset representation is set equal to the dimensionality of an actions representation by changing the length of the vector comprising the asset representation. For instance, the length of the vector $f(y)$ is set equal to the length of vector x by projection function $f$. Projection function $f$ can also change the values of elements of vector x. For instance, values of elements of vector y can be different than values of elements of vector x. Additionally or alternatively, values of elements of vector y can be copied from values of elements of vector x.

The projection function can be any suitable type of projection function, so long as it accepts an asset representation as input and outputs a vector of length equal to the length of an actions representation from actions representation component 202. In one example, the projection function comprising projection function component 208 is a linear function. In this case, the projection function can be written as $f(y)=Wy+b$ where W is a matrix of dimensions M×N, b is a vector of length M, M is the length of the actions representation, x, and N is the length of the asset representation, y. In another example, the projection function comprising projection function component 208 is a neural network, such as a multi-layer perceptron and convolution neural network. In still another example, the projection function comprising projection function component 208 is a non-linear function, such as a filter with coefficients applied to non-linear combinations of elements of an asset representation, (e.g., asset representation y). The projection function may include a sparse filter, that removes a subset of the elements of y that are not necessarily contiguous, to form $f(y)$. The projection function may also include a truncation filter, that removes a subset of the elements of y that are contiguous, to form $f(y)$.

The projection function is an adaptive function containing parameters (e.g., W and b) that are adaptive, and are adjusted by training the projection function based on pairs of actions and assets resulting from the actions (discussed below).

Distance measure component 210 is representative of functionality that calculates a distance measure that measures distances between actions representations, x, from actions representation component 202, and processed asset representations, $f(y)$, from projection function component 208. The distances represent similarity in a vector space and are measured by comparing an actions representation and a processed asset representation in the vector space.

The distance measure can be any suitable distance measure. In one example, the distance measure is a mean-squared error. For instance, an $L_2$ loss function can be used to determine the distance measure, D, according to $D=\|x-f(y)\|^2$, where $\|\cdot\|$ denotes the square root of the sum of the squares of the input argument. In another example, an $L_1$ loss function can be used to determine the distance measure, D, according to $D=|x-f(y)|$, where $|\cdot|$ denotes absolute value. In still another example, a cosine similarity can be used to determine the distance measure, in which case the distance measure is determined from the cosine of the angle between x and $f(y)$. For instance, the distance measure, D, can be calculated according to $D=1-\cos\theta$, where $\theta$ is the angle between x and $f(y)$.

Distance measure component 210 is configured to provide a distance measure for an actions representation, asset representation pair to recommendation component 212. Distance measure component 210 may also store distance measures calculated for actions representation, asset representation pairs to be used for further processing, such as averaging, selecting minimum or maximum distance measures, and the like.

Recommendation component 212 is representative of functionality that processes distance measures from distance measure component 210. Recommendation component 212 receives distance measures from distance measure component 210. Recommendation component 212 can also receive pairs of actions representations and processed asset representations used in calculating the distance measures. Furthermore, recommendation component 212 can access asset representations and assets corresponding to the processed asset representations in the pairs of actions representations and processed asset representations used in calculating the distance measures.

Recommendation component 212 ranks processed asset representations or actions representations based on the distance measures. Recommendation component 212 is configured to recommend processed asset representations or actions representations based on the ranking (discussed below). Recommendation component 212 can also be configured to accumulate distance measures supplied from distance measure component 210 to calculate a loss function. The loss function can be used to adjust parameters of a projection function comprising projection function component 208 in a training mode (discussed below).

Having considered the components of example asset processing application 110, consider now a discussion of training the projection function comprising projection function component 208.

Training the Projection Function

Prior to recommending processed asset representations or actions representations with recommendation component 212, the projection function comprising projection function component 208 is trained to learn a joint embedding between software actions and assets. The projection function is an adaptive function containing parameters (e.g., W and b) that are adjustable. The parameters are adjusted by training the projection function based on pairs of actions and assets resulting from the actions. For instance, actions can be obtained from logs of actions performed by a user and the assets resulting from the actions can be obtained from a project uploaded by the user on an online social platform (e.g., a social media service that facilitates shared communications between groups of users). In one example, a user subscribes to a photo editing service whose logs provide a list of actions performed by the user, from which an actions representation is created. The user posts a photo edited using the photo editing service on a shared media site, from which an asset representation is created.

The pairs of actions and assets resulting from the actions can be obtained in any suitable way. The pairs of actions and assets resulting from the actions can be obtained from publicly available data, private data, licensed data, purchased data, combinations thereof, and the like. In some examples, actions are obtained that occurred over a specified time period, and assets are obtained over the same specified time period so that the obtained assets correspond to the obtained actions (e.g., result from the obtained actions). In one example, the relationship between the obtained assets and obtained actions can be fuzzy. For instance, there can exist some uncertainty in the relationship between the obtained asset and obtained actions, such as the effect of the obtained actions on the obtained asset, or the number of users contributing to the obtained actions. Accordingly, the pairs of actions and assets resulting from the actions can be a fuzzy pair that is not quite one-to-one correspondence.

The pairs of actions and assets resulting from the actions are an input pair to asset processing application 110. Since the actions and assets resulting from the actions are correlated, the input pair can be used to train the projection function comprising projection function component 208. For instance, using the pairs of actions and assets resulting from the actions, the projection function can be trained to learn a joint embedding between software actions and assets.

The pairs of actions and assets resulting from the actions can be stored and accessed by database component 206, which can provide the actions to actions representation component 202 and the assets to asset representation component 204. Actions representation component 202 produces actions representation, x, and asset representation component 204 produces asset representation, y, for each pair of obtained actions and assets resulting from the actions.

Because actions representation, x, and asset representation, y, are correlated, parameters of the projection function, $f$ can be adjusted to minimize a loss function, such as the expected value of the distance measure, D, calculated in distance measure component 210, over a number of pairs of obtained actions and assets resulting from the actions. For instance, suppose there are P pairs of obtained actions and assets resulting from the actions, and a mean-squared error distance measure is used. The optimum parameters of the projection function are found that minimize the expected value of D over all choices of $f$, or $$f_{optimum} = \underset{f}{\operatorname{argmin}} \sum_{i=1}^{P} \|x_i - f(y_i)\|^2$$

where $x_i$, $y_i$ are a pair of obtained actions and assets resulting from the actions for each i. This equation can be solved for the optimum parameters of the projection function in any suitable fashion, such as using stochastic gradient descent, batch gradient descent, mini-batch gradient descent, recursive least squares, and the like.

The optimum parameters of the projection function represent a joint embedding between software actions and assets resulting from the software actions, and can be updated based on new pairs of obtained actions and assets resulting from the actions. Once found by training the projection function, the optimum parameters of the projection function can be used in projection function component 208 to configure asset processing application 110 to (i) recommend software actions to create an asset, and (ii) recommend assets to demonstrate the effects of software actions.

Use of the projection function that is trained using pairs of actions and assets resulting from the actions to recommend software actions and assets constitutes an improvement over current recommendation techniques which primarily, if not exclusively, recommend actions based on a user's software usage history, or recommend assets based on a user's preferences. By learning a joint embedding between software actions and assets, the projection function can be used to recommend software actions and assets. Provided with an asset, a list of software actions can be recommended by using the projection function to compare a representation of the asset with representations of software actions in a vector space. Provided with a list of software actions, an asset can be recommended by using the projection function to compare a plurality of representations of assets with a representation of the list of software actions in a vector space.

Having considered a discussion of training the projection function, consider now a discussion of using asset processing application 110 to recommend software actions to create an asset.

Recommending Software Actions to Create an Asset

Asset processing application 110 can be configured to recommend software actions to create an asset. Suppose a designer wishes to edit or create an asset, such as an image, using asset processing application 110, and makes a file containing the asset accessible to asset processing application 110. Alternatively or additionally, the file can contain an asset representation of the content of the asset, though our discussion will focus on an asset for simplicity. Asset processing application 110 provides the asset to asset representation component 204, which processes the asset to produce asset representation, y. Projection function component 208 processes the asset representation, y, with a projection function, $f$ such as a projection function containing optimum parameters found by training the projection function with pairs of actions and assets resulting from the actions, to produce processed asset representation, $f(y)$.

Database component 206 provides a list or lists of software actions to actions representation component 202. Additionally or alternatively, database component 206 provides actions representations to actions representation component 202. In response to receiving a list of actions or actions representations from database component 206, actions representation component 202 generates a plurality, P, of actions representations, $x_j$, j=1 . . . P. For instance, each of the plurality of actions representations comprises a vector derived from a list of software actions received from database component 206.

In an example, the list of software actions is specified by a user, and the actions representations represent actions on the list of software actions and do not represent actions not on the list of software actions. The list of software actions can include preferences specified by the user and assigned to the actions in the list of software actions. When forming the plurality of actions representations, actions representation component 202 can bias the actions representations based on the preferences specified by the user. For example, the user may specify that certain actions are favored while other actions are disliked. Actions representation component 202 can generate the plurality of actions representations by including the favored actions when possible, and avoiding the disliked actions, for example, by replacing a disliked action with one or more favored actions.

The processed asset representation, $f(y)$, and the plurality of actions representations, $x_j$, are provided to distance measure component 210. Distance measure component 210 calculates a distance measure for each of the plurality of actions representations, $x_j$, and the processed asset representation, $f(y)$. The distance measure measures distances between the processed asset representation and the actions representations, and the distances represent similarity in a vector space and are measured by comparing the processed asset representation and the actions representations in the vector space. For instance, suppose a mean-squared error distance measure is used. In this case, a plurality of distance measures can be calculated according to $$D_j = \|x_j - f(y)\|^2$$

for $j=1 \ldots P$. Distance measure component 210 provides the plurality of distance measures to recommendation component 212.

Recommendation component 212 ranks the plurality of actions representations according to the distance measures received from distance measure component 210 (such as according to smallest to largest distance measures). Based on the ranking, recommendation component 212 recommends at least one list of software actions. For instance, recommendation component 212 recommends the list of software actions that corresponds to the actions representation with the lowest distance measure. In an example, the lowest distance measure corresponds to the highest-ranking actions representation.

Recommending a list of software actions can also include recommending a sequence of software actions or sets of sequences of software actions. For instance, software actions in a list of software actions recommended by recommendation component 212 can be recommended to be performed in a prescribed order, so that certain software actions are performed before or after other software actions. In an implementation, software actions in a list of software actions recommended by recommendation component 212 are each assigned an indicator, such as a number, used to assign an order to the software actions so that the software actions are performed according to a sequence corresponding to the assigned indicators.

Furthermore, the recommended list of software actions recommended by recommendation component 212 can include information regarding preferences set by the user in the list of software actions. For instance, the recommended list of software actions can return indications of how many favorable and how many disliked actions are included in the recommended list of software actions, where favorable and disliked are preferences assigned by the user in the list of software actions.

Asset processing application 110 can also process the asset or asset representation provided by the designer according to the recommended list of software actions, and recommendation component 212 can be configured to recommend that the processed asset or processed asset representation be displayed on computing device 102. For example, the processed asset or processed asset representation may be an image edited according to the recommended list of software actions and displayed on computing device 102. In response to recommending that the processed asset or processed asset representation be displayed, device 102 may automatically display the processed asset or processed asset representation on device 102. Alternatively, in response to recommending that the processed asset or processed asset representation be displayed, device 102 may prompt the user, such as with a query in a graphical user interface, whether the user wishes to proceed with displaying the processed asset or processed asset representation on device 102.

Recommendation component 212 can also be configured to recommend multiple lists of software actions, such as a number of lists of software actions corresponding to actions representations with the lowest distance measures (e.g., top five or top ten lists of software actions correspond to actions representations with five or ten lowest distance measures). Furthermore, the number of lists of software actions to be recommended by recommendation component 212 can be set by the user, such as by a control or counter in a graphical user interface comprising device 102.

Use of a projection function that is trained using pairs of actions and assets resulting from the actions to recommend software actions constitutes an improvement over current recommendation techniques which primarily, if not exclusively, recommend actions based on a user's software usage history. By learning a joint embedding between software actions and assets, the projection function can be used to recommend software actions that are useful to an asset (e.g., to edit or create an asset), because recommended software actions can be found that have a representation that is similar to a representation of the asset formed using the projection function, where similarity is measured in a vector space.

Having considered a discussion of using asset processing application 110 to recommend software actions to create an asset, consider now a discussion of using asset processing application 110 to recommend assets to demonstrate the effects of software actions.

Recommending Assets to Demonstrate the Effects of Software Actions

Asset processing application 110 can be configured to recommend assets to demonstrate the effects of software actions. Suppose a designer wishes to know the effects of proposed software actions on assets when using asset processing application 110. The designer makes available to asset processing application 110 a list of software actions. For instance, the designer can specify a list of software actions in a graphical user interface, or load a list from a file, or access a database of actions. Alternatively or additionally, the designer can make available actions representations to asset processing application 110, though our discussion will focus on a list of software actions for simplicity. Asset processing application 110 provides the list of software actions to actions representation component 202, which processes the list of software actions to produce actions representation, x.

In an example, producing the actions representation, x, includes determining a frequency and a type of each action on the list of software actions, the frequency representing how often each action is performed, and the type representing an editing classification of each action (such as whether the action comprises applying a filter to all pixels, is a nonlinear edit such as a crop to an image, involves a color change, adjusts an exposure, and the like). Producing the actions representation can also include modeling sequence patterns (e.g., time-series) of a list of software actions. The actions representation, x, can be constructed to order actions based on the classification of actions. For instance, the actions representation, x, can be constructed so that a nonlinear edit such as a crop is applied before linear edits, such as a filter which applies a transformation to all pixels of an image.

Database component 206 accesses at least one database and provides a plurality of assets to asset representation component 204. Additionally or alternatively, database component 206 provides asset representations to asset representation component 204. For instance, database component 206 can access a database of asset representations corresponding to assets that have been processed by a projection function configured to set a dimensionality of the asset representations equal to a dimensionality of the actions representation determined by the length of the vector comprising the actions representation, x (e.g., set to have vector lengths equal).

In response to receiving assets or asset representations from database component 206, asset representation component 204 generates a plurality, P, of asset representations, $y_j$, j=1 ... P. For instance, each of the plurality of asset representations comprises a vector derived from content of a respective asset provided by database component 206.

Alternatively or additionally, asset representation component 204 can process asset representations provided from database component 206 to produce the plurality of asset representations. For example, asset representation component 204 can apply a transform to an asset representation (such as in inverse transform that transforms the asset representation into an original asset), and then apply a projection function to form a vectorized asset representation of desired length and in a desired vector space, different from the length of the vector and the vector space corresponding to an asset representation provided from database component 206.

Projection function component 208 processes the plurality of asset representations, $y_j$, with a projection function, $f$, such as a projection function containing optimum parameters found by training the projection function with pairs of actions and assets resulting from the actions, to produce processed asset representations, $f(y_j)$.

The processed asset representations, $f(y_j)$, and the actions representation, x, are provided to distance measure component 210. Distance measure component 210 calculates a distance measure for the actions representation, x, and each of the plurality of processed asset representations, $f(y_j)$. The distance measure measures distances between the actions representation and the processed asset representations, and the distances represent similarity in a vector space and are measured by comparing the actions representation and the processed asset representations in the vector space. For instance, suppose a mean-squared error distance measure is used. In this case, a plurality of distance measures can be calculated according to $$D_j = \|x - f(y_j)\|^2$$

for j=1 ... P. Distance measure component 210 provides the plurality of distance measures to recommendation component 212.

Recommendation component 212 ranks the plurality of asset representations, $y_j$, processed asset representations, $f(y_j)$, or assets provided from database component 206 according to the distance measures received from distance measure component 210. Based on the ranking, recommendation component 212 recommends at least one asset, asset representation, or processed asset representation. For instance, recommendation component 212 recommends the asset that corresponds to the processed asset representation with the lowest distance measure. In an example, the lowest distance measure corresponds to the highest-ranking processed asset representation.

Recommendation component 212 can also be configured to recommend multiple assets, such as a number of assets corresponding to processed asset representations with the lowest distance measures (e.g., top five or top ten assets correspond to processed asset representations with five or ten lowest distance measures). Furthermore, the number of assets to be recommended by recommendation component 212 can be set by the user, such as by a control or counter in a graphical user interface comprising device 102.

Assets and asset representations recommended by recommendation component 212 can be displayed on device 102. For instance, recommendation component 212 can be configured to recommend that the recommended asset or assets be displayed on device 102. In response to recommending that the recommended asset or assets be displayed, device 102 may automatically display the recommended asset or assets on device 102. Alternatively, in response to recommending that the recommended asset or assets be displayed, device 102 may prompt the user, such as with a query in a graphical user interface, whether the user wishes to proceed with displaying the recommended asset or assets on device 102.

In one example, recommendation component 212 is configured to apply software edits corresponding to the actions representation, x to an image selected by a user, such as the designer. For instance, the user may be satisfied with the recommended asset from recommendation component 212 and select in a graphical user interface to apply software edits in the list of software actions to an image selected by the user.

In an implementation, recommendation component 212 is configured to recommend an alternative action not included in the list of software actions. For instance, asset processing application 110 can be configured to recognize when an action not on a provided list of software actions would result in a lower distance measure than those distance measures corresponding to the list of software actions, and therefore recommend the alternative action. For example, the alternative action can be based on determining a ranking by applying a distance measure to at least one of the asset representations corresponding to at least one of the recommended assets or asset representations, and an alternative actions representation including the alternative action. If the calculated distance measure is less than the distance measures determined using the list of software actions, recommendation component 212 can be configured to recommend the alternative action.

Use of a projection function that is trained using pairs of actions and assets resulting from the actions to recommend assets constitutes an improvement over current recommendation techniques which primarily, if not exclusively, recommend assets based on a user's preferences. By learning a joint embedding between software actions and assets, the projection function can be used to recommend assets that are useful to illustrate the effects of software actions, because recommended assets can be found that have a representation formed using the projection function that are similar to a representation of proposed software actions, where similarity is measured in a vector space.

Having considered a digital medium environment that includes an example asset processing application, consider now example methods in accordance with one or more embodiments.

Example Procedures

Figure 3:
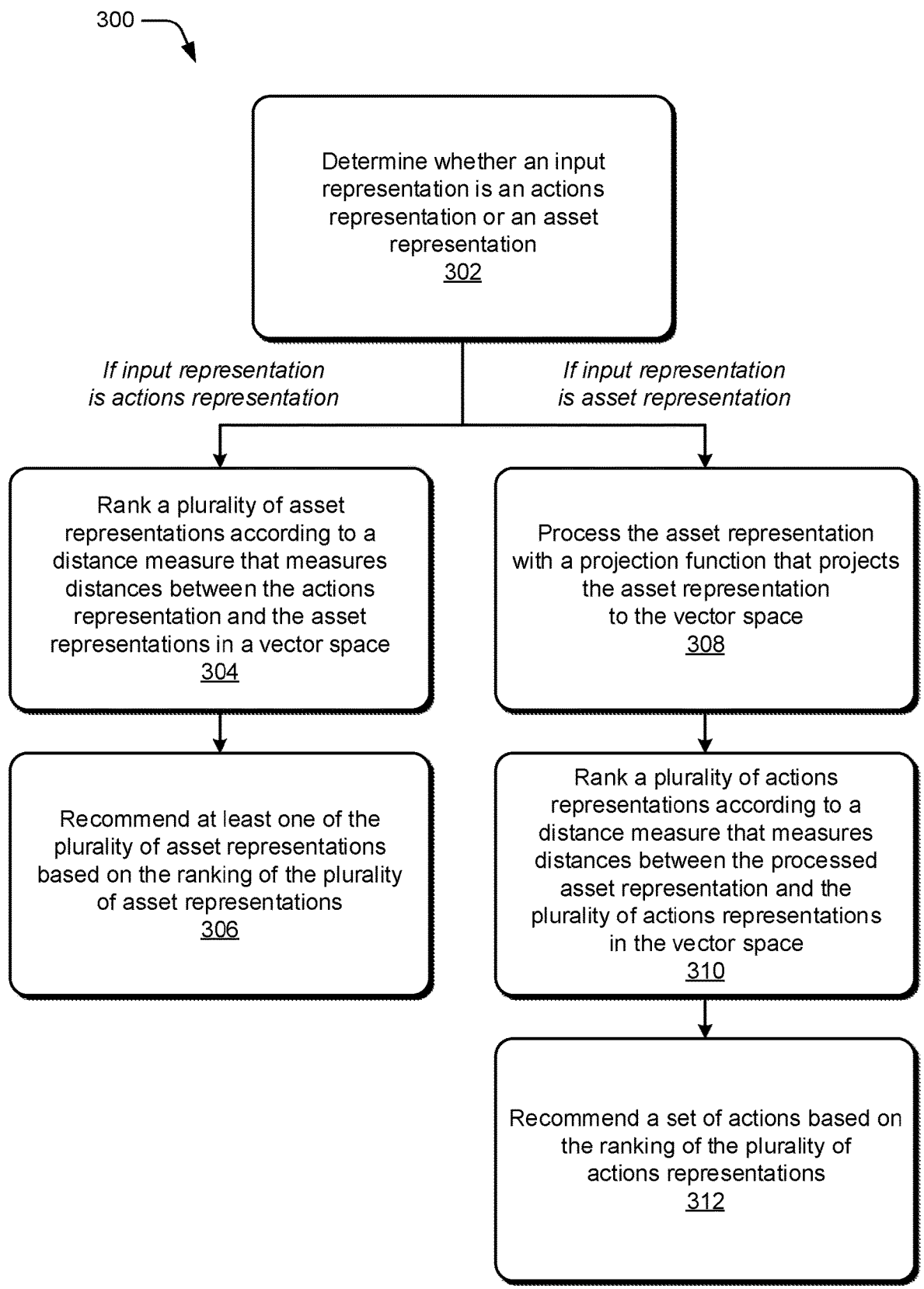
FIG. 3 is a flow diagram depicting an example procedure in accordance with one or more aspects of the disclosure.

FIG. 3 illustrates an example procedure 300 for recommending assets and a set of actions in accordance with one or more embodiments. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some embodiments the procedure may be performed in a digital medium environment by a suitably configured device, such as the example computing device 102 of FIG. 1 that makes use of an asset processing application 110, such as that described above. An asset processing application implementing procedure 300 may be an independent application that has been installed on computing device 102, a service hosted by service provider 112 that is accessible by computing device 102, or a plug-in module to computing device 102.

It is determined whether an input representation is an actions representation or an asset representation (block 302). An actions representation comprises a vector derived from a list of software actions. An asset representation comprises a vector derived from content of an asset. In an example, the length of the vector comprising an actions representation is not the same as the length of the vector comprising an asset representation. The input representation can be received from a component that accesses databases of actions representations and databases of asset representations, such as a database accessible by database component 206 in FIG. 2.

It can be determined whether the input representation is an actions representation or an asset representation at block 302 in any suitable fashion. In one example, a component that provides the input representation also provides an indicator of whether the input representation is an actions representation or an asset representation. For example, an indicator may be included in a header of the input representation. In another example, it is determined whether the input representation is an actions representation or an asset representation based on the length of the vector comprising the input representation. For instance, if the length of the vector comprising the input representation is above a pre-determined threshold, such as 100 or 1000, it is determined that the input representation is an asset representation, rather than an actions representation. The pre-determined threshold can be set equal to, or slightly larger than, the size of the vector space containing the actions representation. Additionally or alternatively, the length of the vector comprising the actions representation may be known a priori, and if the length of the vector comprising the input representation is not equal to the known length of the vector comprising the actions representation, then it is determined that the input representation is an asset representation. When the length of the vector comprising the input representation does equal the known length of the vector comprising the actions representation, this condition can be used alone or in combination with other methods to determine that the input representation is an actions representation.

In still another example, a user can specify the input representation as an actions representation or an asset representation. For instance, a user may specify a list of software actions and generate an actions representation (e.g., by clicking a "generate actions representation button") in a graphical user interface, which designates the input representation as an actions representation.

If it is determined at block 302 that the input representation is an actions representation, procedure 300 proceeds to block 304. If, on the other hand, it is determined that the input representation is an asset representation, procedure 300 proceeds block 308.

A plurality of asset representations are ranked according to a distance measure (block 304). The distance measure measures distances between the actions representation and the asset representations in a vector space. Distances represent similarity in the vector space and are measured by comparing the actions representation and the processed asset representations in the vector space. In one example, the distance measure is a mean-squared error between the actions representation and each of the processed asset representations. The ranking can be in ascending or descending order of distance measure. For instance, a highest-ranking processed asset representation can correspond to a smallest distance measure, which may be in a first or last position of an ordered, ranked list.

The plurality of asset representations can be accessed from a database of asset representations stored as vectors. In an example, the vectors can be output from a neural network, wherein the vectors represent activation values of neurons comprising the neural network. In an example, vectors comprising the asset representations are not a same length as a vector comprising the actions representation. In another example, the asset representations are stored in a database and correspond to assets that have been processed by a projection function configured to set a dimensionality of the asset representations equal to a dimensionality of the actions representation determined by the length of the vector comprising the actions representation (e.g., so the vector lengths are equal).

In an implementation, the asset representations are accessed by accessing a plurality of assets and processing the plurality of assets to access the plurality of asset representations. For instance, the plurality of asset representations can be generated from a plurality of accessed assets using a projection function to represent content of the assets as vectors.

The asset representations can be processed with a projection function by changing lengths of vectors comprising the asset representations. For instance, the projection function processes the asset representations so that vectors comprising the processed asset representations are a length equal to a length of the vector comprising the actions representation, so that the distance measures can be determined in the vector space at block 304 by comparing vectors in the vector space. If, however, the accessed asset representations comprise vectors of a length equal to the length of the vector comprising the actions representation, then processing by the projection function can be bypassed, such as by providing a user-selectable option in a graphical user interface for bypassing processing by a projection function when it is detected that the vectors are of equal length.

At least one of the plurality of asset representations is recommended based on the ranking of the plurality of asset representations (block 306). For example, an asset representation or an asset corresponding to an asset representation with lowest distance measure in the ranking can be recommended. Multiple asset representations can be recommended, such as a predetermined number of asset representations. For instance, the predetermined number of asset representations corresponding to asset representations or processed asset representations with lowest distance measures in the ranking can be recommended. Recommending asset representations can also include recommending an asset from which the recommended asset representation is derived. For instance, recommending an asset representation can include displaying an asset corresponding to the recommended asset representation, such as displaying an image in a graphical user interface.

Block 308 is entered upon determining the input representation is an asset representation at block 302. For instance, the asset representation can be an image representation corresponding to an output of a neural network or similar function that processes an image and produces a vector derived from content of the image.

The asset representation is processed with a projection function that projects the asset representation to a vector space (block 308). For instance, the projection function changes a length of the vector comprising the asset representation. In one example, the projection function is configured to set a length of the vector comprising the processed asset representation (e.g., the asset representation processed by the projection function) equal to the length of the vectors comprising the actions representations. Furthermore, processing by the projection function can change values of elements of the vector comprising the asset representation. For instance, the vector comprising the asset representation can be multiplied by a matrix that both reduces the length of the vector comprising the asset representation and changes values of the elements of the vector comprising the asset representation.

Furthermore, the projection function can be accessed from a database of projection functions, such as a database accessible by database component 206 in FIG. 2. The projection function is an adaptive function containing parameters that have been adjusted based on pairs of actions and assets resulting from the actions. In an example, the actions have been obtained from logs of actions performed by a user and the assets resulting from the actions have been obtained from a project uploaded by the user on an online social platform.

A plurality of actions representations are ranked according to a distance measure (block 310). The distance measure measures distances between the processed asset representation and the plurality of actions representations in a vector space, such as the vector space at block 308. The distances represent similarity in the vector space and are measured by comparing the processed asset representation and the plurality of actions representations in the vector space. In one example, the distance measure is a mean-squared error between the processed asset representation and each of the accessed asset representations. The ranking can be in ascending or descending order of distance measure. For instance, a highest-ranking accessed action representation can correspond to a smallest distance measure, which may be in a first or last position of an ordered, ranked list.

The plurality of actions representations used in the ranking can be accessed by any suitable fashion. Each actions representation comprises a vector of a same length derived from a list of software actions. The plurality of actions representations can be accessed from a database of actions representations stored as vectors. The plurality of actions representations can represent actions specified by a user or performed by a user. In an example, a list of actions can be specified by a user, and the plurality of actions representations can represent actions on the list of actions specified by the user or performed by the user, or both specified and performed by the user. The plurality of actions representations can also be based on actions obtained from pairs of actions and assets that were used to train a projection function, such as the projection function used at block 308.

A set of actions is recommended based on the ranking of the plurality of actions representations (block 312). For example, a set of actions corresponding to an actions representation with lowest distance measure in the ranking can be recommended. Furthermore, an asset corresponding to the asset representation can be processed according to the recommended set of actions. In an example, recommending the set of actions includes displaying (e.g., automatically or conditionally upon user approval) an asset or asset representation processed according to the recommended set of actions.

Figure 4:
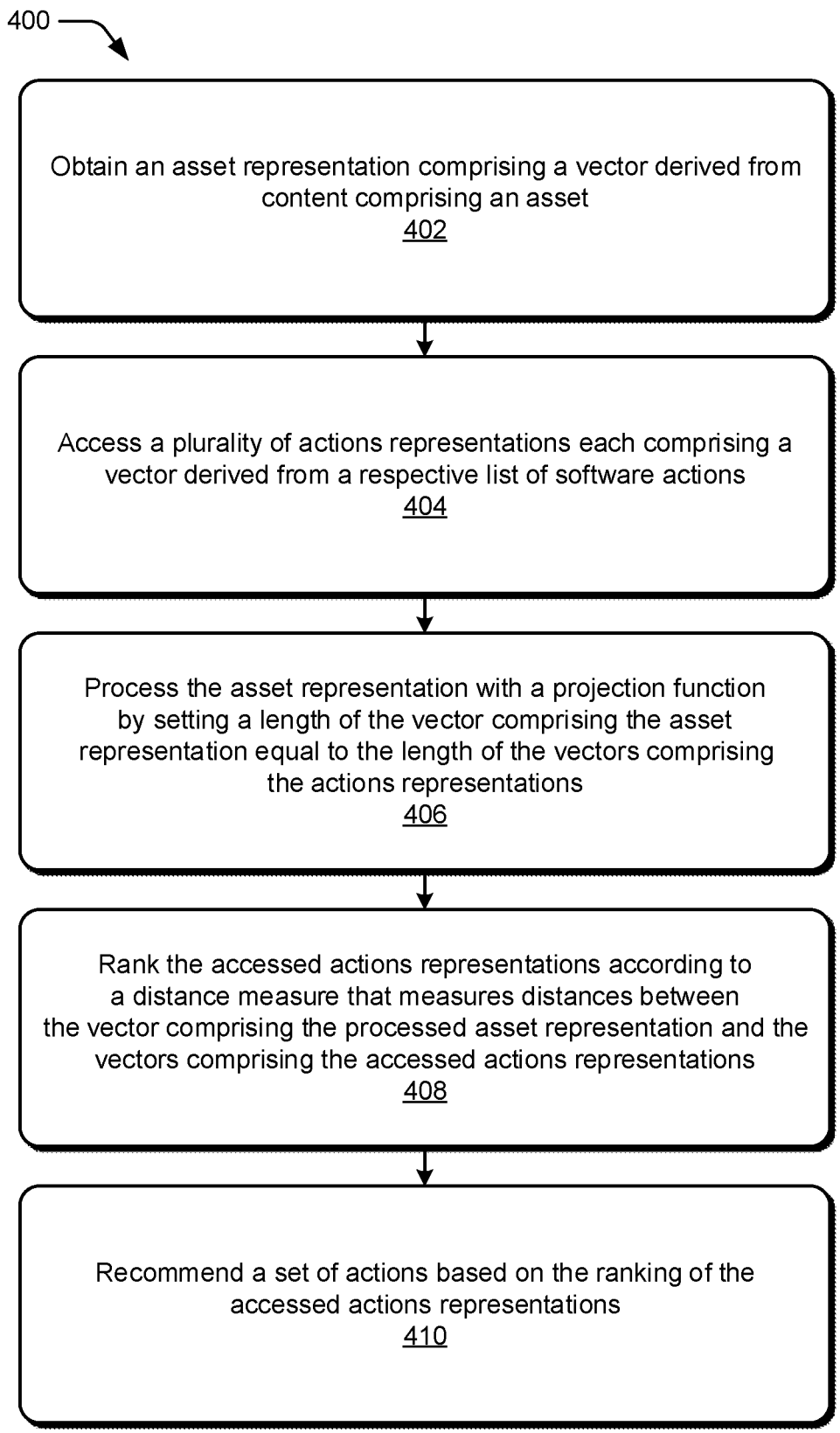
FIG. 4 is a flow diagram depicting an example procedure in accordance with one or more aspects of the disclosure.

FIG. 4 illustrates an example procedure 400 for recommending a set of actions in accordance with one or more embodiments. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some embodiments the procedure may be performed in a digital medium environment by a suitably configured device, such as the example computing device 102 of FIG. 1 that makes use of an asset processing application 110, such as that described above. An asset processing application implementing procedure 400 may be an independent application that has been installed on computing device 102, a service hosted by service provider 112 that is accessible by computing device 102, or a plug-in module to computing device 102.

An asset representation is obtained (block 402). The asset representation comprises a vector derived from content comprising an asset. The asset can comprise an image, a video, an audio file, a document (text, map, or manual), a presentation, a drawing, an editable web page, combinations thereof, and the like.

The vector comprising the asset representation can be formed by processing the content comprising the asset with a projection function configured to derive a vector from an asset. The projection function can be assessed in any suitable way, such as from a database, or selected from a user in a graphical user interface among a choice of projection functions. Furthermore, the projection function may be based on properties of the received asset, such as asset size. For instance, to facilitate efficient processing, for larger-sized assets (e.g., above a certain threshold of size), a linear projection function may be selected, and for smaller-sized assets (e.g., below another or the same threshold of size), a neural network may be selected. Alternatively or additionally, the projection function may be based on resources of the computing device implementing procedure 400. For instance, for computing devices with less powerful resources (e.g., processor speed, type, or architecture, memory size or type, or buffer size), a linear projection function may be selected, and for computing devices with more powerful resources, a neural network may be selected.

A plurality of actions representations each comprising a vector derived from a respective list of software actions is accessed (block 404). Each vector is of a same length. The plurality of actions representations can be accessed from a database of actions representations stored as vectors. The plurality of actions representations can represent actions specified by a user. In an example, a list of actions can be specified by a user, and the plurality of actions representations can represent actions on the list of actions specified by the user (e.g., be generated in response to receiving a list of software actions specified by the user).

The asset representation is processed with a projection function by setting a length of the vector comprising the asset representation equal to the length of the vectors comprising the actions representations (block 406). For instance, the length of the vector comprising the processed asset representation (e.g., the asset representation processed with the projection function) is equal to the length of the vectors comprising the actions representations.

The projection function used at block 406 can be assessed in any suitable way, such as from a database, or selected from a user in a graphical user interface among a choice of projection functions. Furthermore, the second projection function may be based on properties of the asset corresponding to the obtained asset representation, such as asset size, or properties of the asset representation, such as the length of the vector comprising the asset representation. For instance, to facilitate efficient processing, for larger-sized asset representations, a linear projection function may be selected, and for smaller-sized asset representations, a neural network may be selected. Alternatively or additionally, the projection function may be based on resources of the computing device implementing procedure 400. For instance, for computing devices with less powerful resources (e.g., processor speed, etc.), a linear projection function may be selected as the projection function, and for computing devices with more powerful resources, a neural network may be selected as the projection function.

The accessed actions representations are ranked according to a distance measure that measures distances between the vector comprising the processed asset representation and the vectors comprising the accessed actions representations (block 408). The distances represent similarity in a vector space and are measured by comparing the processed asset representation and the accessed actions representations in the vector space. In one example, the distance measure is a mean-squared error and is calculated according to $D_j=\|x_j-f(y)\|^2$ where $D_j$ denote the plurality of distance measures, $x_j$ denote the accessed actions representations, and $f(y)$ denotes the processed asset representation.

A set of actions is recommended based on the ranking of the accessed actions representations (block 410). For example, a set of actions corresponding to an accessed actions representation with lowest distance measure in the ranking can be recommended. Furthermore, the asset corresponding to the obtained asset representation can be processed according to the recommended set of actions. In an example, recommending the set of actions includes displaying (e.g., automatically or conditionally upon user approval) the asset corresponding to the obtained asset representation processed according to the recommended set of actions. Moreover, multiple sets of actions can be recommended and displayed in an ordered list according to the distance measures.

Figure 5:
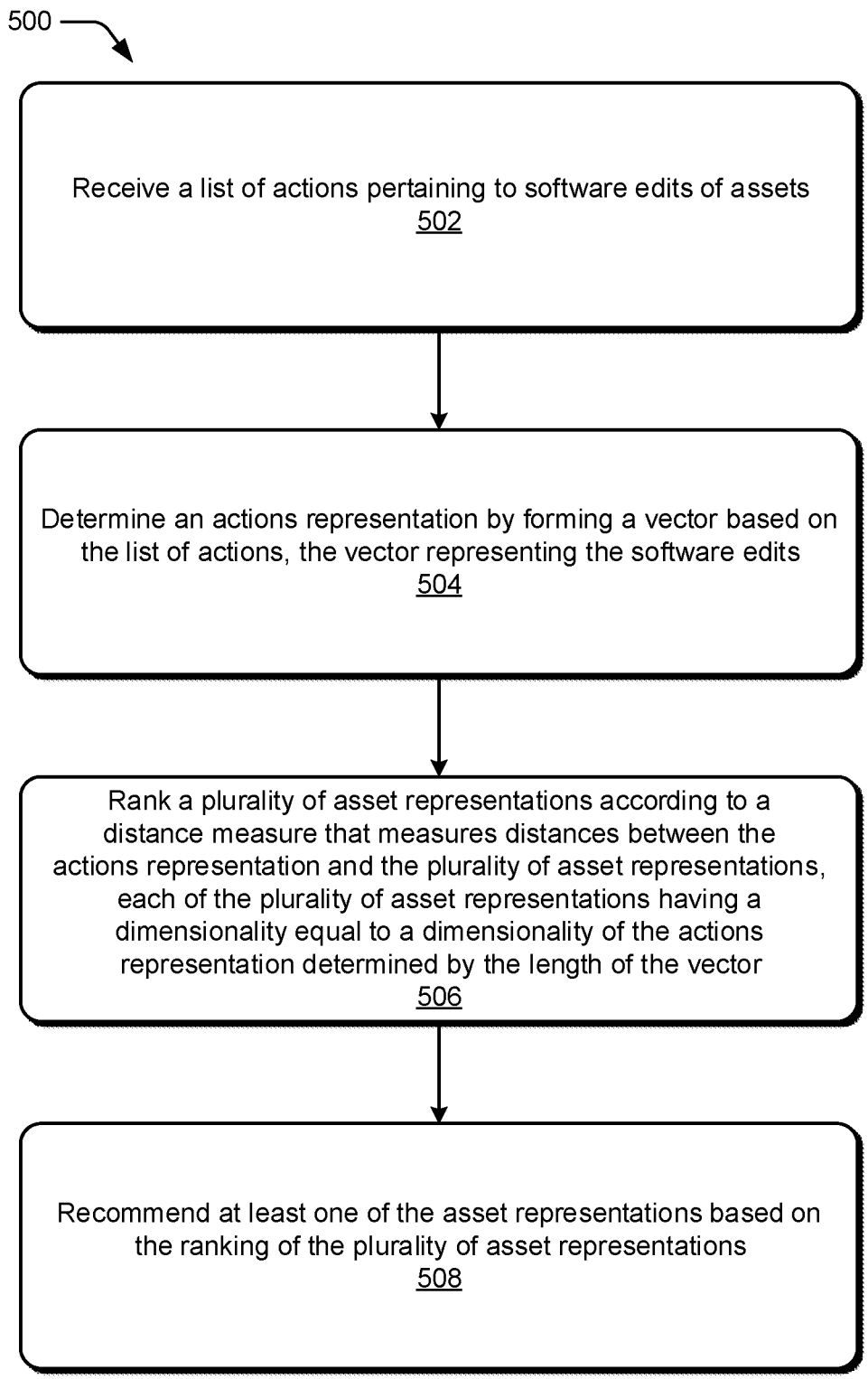
FIG. 5 is a flow diagram depicting an example procedure in accordance with one or more aspects of the disclosure.

FIG. 5 illustrates an example procedure 500 for recommending asset representations in accordance with one or more embodiments. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some embodiments the procedure may be performed in a digital medium environment by a suitably configured device, such as the example computing device 102 of FIG. 1 that makes use of an asset processing application 110, such as that described above. An asset processing application implementing procedure 500 may be an independent application that has been installed on computing device 102, a service hosted by service provider 112 that is accessible by computing device 102, or a plug-in module to computing device 102.

A list of actions pertaining to software edits of assets is received (block 502). For instance, the list of actions may be a list of proposed software edits for an image specified by a user, such as a list of software actions that have been performed by a user (e.g., most-recently performed software actions by a user). The list may be an ordered list (e.g., a sequence of software actions, one action following another action according to an ordering), or an unordered list (e.g., a group of software actions with no particular sequence associated with the actions in the group). The list of actions can be received from a component that is configured to access a database of actions.

An actions representation is determined by forming a vector based on the list of actions, the vector representing the software edits (block 504). Determining the actions representation can include determining a frequency and a type of each action on the list of actions. The frequency represents how often each action is performed (e.g., a number of occurrences of the action in the list of actions). The type represents an editing classification of each action (such as whether the action comprises applying a predetermined filter, is a nonlinear edit, involves a color change, adjusts an exposure, and the like). In one example, the actions representation preserves an order of software edits in the list of actions. In another example, the actions representation is determined without an order of the actions being indicated.

A plurality of asset representations are ranked according to a distance measure (block 506). The distance measure measures distances between the actions representation and the plurality of asset representations. The distances represent similarity in a vector space and are measured by comparing the actions representation and the plurality of asset representations in the vector space. In one example, the distance measure is a mean-squared error and is calculated according to $D_j=\|x-f(y_j)\|^2$ where $D_j$ denote the plurality of distance measures, x denotes the actions representation, and $f(y_j)$ denotes the accessed asset representations.

The plurality of asset representations can be accessed in any suitable fashion, such as by accessing a database of asset representations. The asset representations correspond to assets that have been processed by a projection function configured to set a dimensionality of the asset representations equal to a dimensionality of the actions representation determined by the length of the vector. For instance, the length of the vectors comprising the asset representations in the database is the same as the length of the vector comprising the actions representation. Alternatively or additionally, a database of assets can be accessed, and asset representations can be generated from the accessed assets (e.g., using any suitable projection function) to produce the plurality of asset representations.

At least one of the asset representations is recommended based on the ranking of the plurality of asset representations (block 508). For instance, the selected at least one of the asset representations can correspond to at least one of the accessed asset representations with highest ranking. In one example, an asset representation corresponding to an accessed asset representation with lowest distance measure in the ranking can be recommended. Furthermore, an asset or assets corresponding to the recommended asset representations can be recommended. The recommended asset or assets can be displayed in a graphical user interface in response to determining that the recommended asset or assets are to be recommended.

The above described procedures constitute an improvement over current recommendation methods which primarily, if not exclusively, recommend actions based on a user's software usage history, or recommend assets based on a user's preferences. By learning a joint embedding between software actions and assets, a projection function can be used to efficiently recommend useful software actions and assets. For example, suppose a designer inputs an image to an image editing application. A database of software actions can be accessed, and software actions can be quickly recommended that can be applied to the image with a reliable outcome, since the recommended software actions can be found that have a representation that is similar to a representation of the image formed using a projection function trained on pairs of actions and images resulting from the actions. In another example, suppose a designer inputs a sequence of software actions and wishes to know the effects of those software actions on assets. A database of assets can be accessed, and assets can be quickly recommended that reliably demonstrate the effects of the software actions, since assets can be recommended that have representations (e.g., formed using a projection function trained on pairs of actions and assets resulting from the actions) that are similar to a representation of the software actions.

Having considered example procedures in accordance with one or more implementations, consider now an example system and device that can be utilized to practice the inventive principles described herein.

Example System and Device

Figure 6:
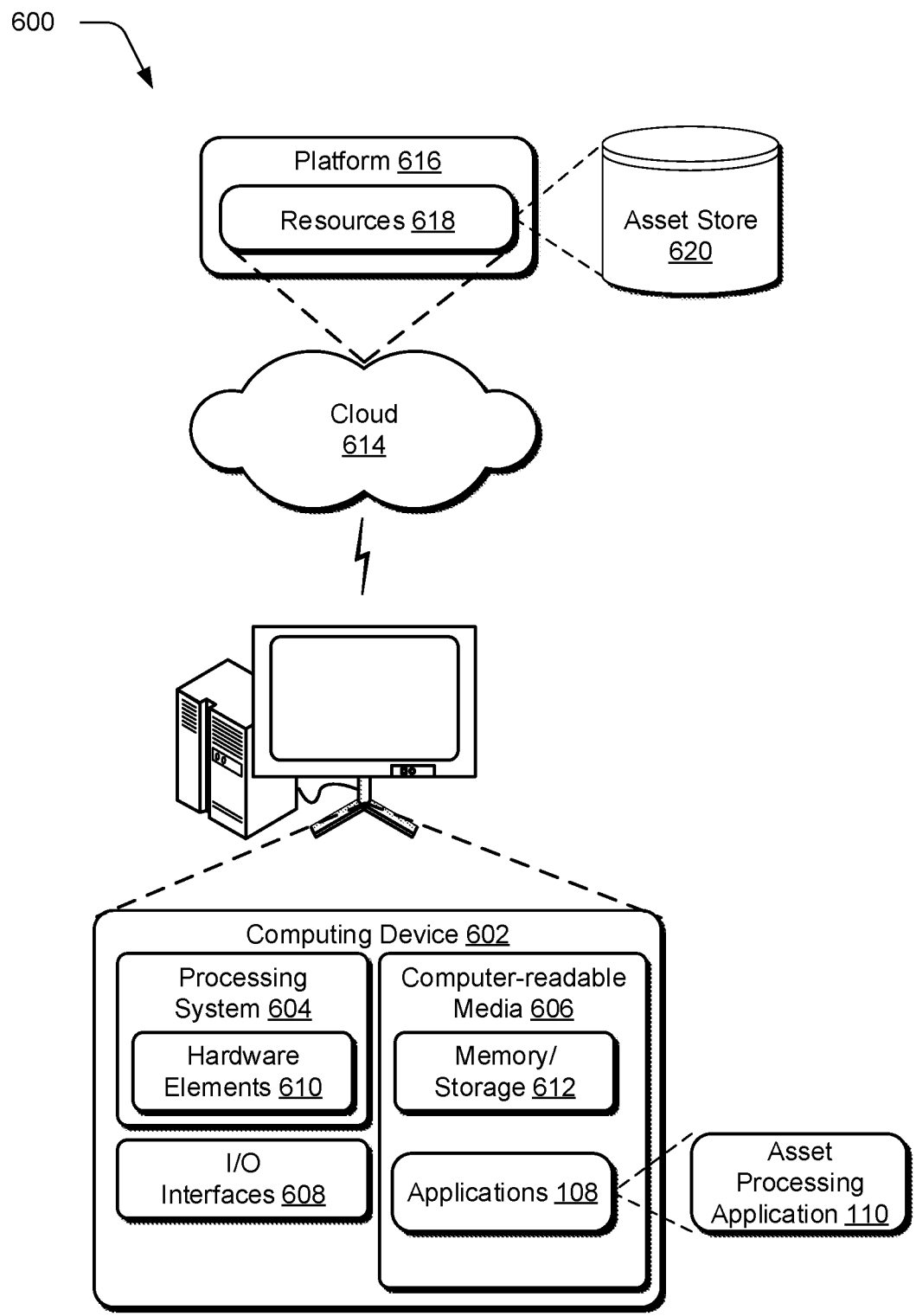
FIG. 6 illustrates an example system including various components of an example device that can be employed for one or more implementations described herein.

FIG. 6 illustrates an example system generally at 600 that includes an example computing device 602 that is representative of one or more computing systems and devices that may implement the various techniques described herein. This is illustrated through inclusion of the applications 108 and, in particular, asset processing application 110, which operates as described above. The computing device 602 may be, for example, a server of a service provider, a device associated with a client (e.g., a client device), an on-chip system, or any other suitable computing device or computing system.

The example computing device 602 includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)), nonvolatile media (such as read only memory (ROM), Flash memory, optical disks, magnetic disks, and so forth), or combinations thereof. The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 806 are representative of modules, programmable device logic, fixed device logic implemented in a hardware form, or combinations thereof that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 610, or combinations thereof. The computing device 602 may be configured to implement particular instructions and functions corresponding to the software and hardware modules. Accordingly, implementation of a module that is executable by the computing device 602 as software may be achieved at least partially in hardware, e.g., through use of computer-readable storage media and hardware elements 610 of the processing system 604. The instructions and functions may be executable/operable by one or more articles of manufacture (for example, one or more computing devices 602 or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and is representative of a platform 616 for resources 618. The platform 616 abstracts underlying functionality of hardware (e.g., servers) and software resources of the cloud 614. The resources 618 may include applications, data, or applications and data that can be utilized while computer processing is executed on servers that are remote from the computing device 602. Resources 618 can also include services provided over the Internet, through a subscriber network, such as a cellular or Wi-Fi network, or combinations thereof. Resources 618 can include asset store 620, which stores original assets, asset representations, actions, and actions representations, and may be accessed by computing device 602.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

In one or more implementations, a digital medium environment includes an asset processing application that performs editing of assets. A projection function is trained using pairs of actions pertaining to software edits and assets resulting from the actions. The projection function is used in the asset processing application to recommend software actions to create an asset, and also to recommend assets to demonstrate the effects of software actions.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment including an asset processing application, a method implemented by at least one computing device via the asset processing application, the method comprising:
  determining whether an input representation includes an actions vector or an asset vector, the asset vector representing content of an asset, the actions vector having elements that indicate a number of occurrences of software edits in a list of the software edits usable to edit the asset, the actions vector belonging to a vector space having dimensions corresponding to the software edits;
  if the input representation is determined to include the actions vector:
  ranking a plurality of asset representations according to a distance measure between the actions vector and the asset representations in the vector space; and
  recommending at least one of the plurality of asset representations based on the ranking of the plurality of asset representations; and
  if the input representation is determined to include the asset vector:
  processing the asset vector with a projection function that projects the asset vector to the vector space to form a processed asset representation;

ranking a plurality of actions representations according to the distance measure between the processed asset representation and the plurality of actions representations in the vector space; and recommending a set of actions based on the ranking of the plurality of actions representations.

2. The method as described in claim 1, further comprising setting vectors of the plurality of asset representations with the projection function to a length equal to a length of the actions vector.

3. The method as described in claim 1, further comprising:
setting a length threshold to be greater than or equal to a number of the dimensions of the vector space;
comparing a length of the input representation to the length threshold; and
wherein the determining whether the input representation includes the actions vector or the asset vector is based on the comparing by determining the input representation includes the asset vector when the length of the input representation is greater than the length threshold or determining the input representation includes the actions vector when the length of the input representation is not greater than the length threshold.

4. The method as described in claim 1, further comprising processing the asset with the set of actions to form a processed asset, and wherein the recommending the set of actions includes recommending the processed asset together with the set of actions.

5. The method as described in claim 1, wherein the plurality of actions representations represent user-specified software actions.

6. The method as described in claim 1, wherein the projection function is an adaptive function containing parameters that are adjusted based on pairs of actions and assets resulting from the actions.

7. The method as described in claim 6, wherein the actions are obtained from logs of actions performed by a user and the assets resulting from the actions are obtained from a project uploaded by the user on an online social platform.

8. The method as described in claim 1, wherein the projection function represents a joint embedding between software edits represented by the plurality of actions representations and assets represented by the plurality of asset representations.

9. A system implemented by at least one computing device in a digital medium environment, the system comprising:
a processing system; and
at least one computer readable medium storing instructions executable via the processing system to implement an asset processing application configured to:
obtain an asset representation including an asset vector derived from content of an asset;
access a plurality of actions representations each including an actions vector derived from a list of software edits usable to edit the asset, the actions vector having elements that indicate a number of occurrences of the software edits in the list of the software edits, the actions vector belonging to a vector space having dimensions corresponding to the software edits;
process the asset representation with a projection function by setting a length of the asset vector equal to a length of the actions vectors to form a processed asset representation;
rank the actions representations according to a distance measure between the processed asset representation and the actions vectors in the vector space; and
recommend a set of actions based on the rank of the actions representations.

10. The system as described in claim 9, wherein the asset processing application is configured to process the asset according to the set of actions to form a processed asset, and recommend the set of actions including to display the processed asset.

11. The system as described in claim 9, wherein the asset processing application is configured to determine the set of actions from a highest-ranking actions representation and the actions include designators that indicate a relative order in which the actions are to be applied.

12. The system as described in claim 9, wherein the asset processing application is configured to:
receive a list of user actions including user preferences for the user actions;
replace at least one of the software edits in the list of software edits with at least one of the user actions based on the user preferences; and
generate at least one of the actions representations based on the list of software edits with the at least one of the software edits replaced by the at least one of the user actions.

13. The system as described in claim 9, wherein the asset processing application is configured to:
determine a size of the asset representation; and
select the projection function from a plurality of projection functions having different architectures and implementation complexities based on comparing the size of the asset representation to a threshold size.

14. The system as described in claim 9, wherein the asset processing application is configured to access the list of the software edits that includes user preferences indicating user-favored software edits and user-disliked software edits, and recommend the set of actions including a first indicator of a number of the user-favored software edits in the set of actions and a second indicator of a number of the user-disliked software edits in the set of actions.

15. The system as described in claim 9, wherein the asset processing application is configured to implement the distance measure as a mean-squared error.

16. In a digital medium environment including an asset processing application, a method implemented by at least one computing device via the asset processing application, the method comprising:
a step for receiving a list of actions including software edits for editing assets;
a step for generating an actions representation by forming a vector based on the list of actions, the vector having elements that indicate a number of occurrences of the software edits in the list of actions, the vector belonging to a vector space having dimensions corresponding to the software edits;
a step for ranking a plurality of asset representations according to a distance measure between the actions representation and the plurality of asset representations, each asset representation of the plurality of asset representations having a dimensionality equal to a dimensionality of the actions representation determined by a length of the vector; and
a step for recommending at least one of the asset representations based on the ranking of the plurality of asset representations.

17. The method as described in claim 16, wherein the step for the generating the actions representation includes determining a frequency and a type of each action on the list of actions, the frequency representing how often each action is performed, the type representing an editing classification of each action, the actions representation generated to order the actions based on the editing classification of each action so that the actions of a first type of the editing classification are performed before the actions of a second type of the editing classification.

18. The method as described in claim 16, wherein the step for recommending at least one of the asset representations includes displaying at least one asset associated with the at least one of the asset representations.

19. The method as described in claim 16, further comprising a step for recommending an alternative action not included in the list of actions based on determining a ranking by applying the distance measure to the at least one of the asset representations and an alternative actions representation including the alternative action.

20. The method as described in claim 16, wherein the distance measure is a mean-squared error.

* * * * *